(12) United States Patent
Liu et al.

(10) Patent No.: US 8,613,000 B2
(45) Date of Patent: Dec. 17, 2013

(54) METHOD AND APPARATUS FOR DYNAMICALLY ASSIGNING I/O DEVICE IN VIRTUAL MACHINE SYSTEM

(75) Inventors: Chunmei Liu, Beijing (CN); Jiancheng Liu, Beijing (CN); Chunyu Song, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1492 days.

(21) Appl. No.: 12/067,342

(22) PCT Filed: Jul. 19, 2006

(86) PCT No.: PCT/CN2006/001768
§ 371 (c)(1),
(2), (4) Date: Mar. 19, 2008

(87) PCT Pub. No.: WO2007/033557
PCT Pub. Date: Mar. 29, 2007

(65) Prior Publication Data
US 2008/0276258 A1 Nov. 6, 2008

(30) Foreign Application Priority Data

Sep. 19, 2005 (CN) .......................... 2005 1 0103064

(51) Int. Cl.
*G06F 9/44* (2006.01)
*G06F 9/455* (2006.01)
(52) U.S. Cl.
USPC .............................................. 719/327; 718/1
(58) Field of Classification Search
USPC .......................................... 719/327; 709/220
See application file for complete search history.

(56) References Cited

U.S. PATENT DOCUMENTS

| 4,533,996 | A | 8/1985 | Hartung et al. |
| 7,082,598 | B1 * | 7/2006 | Le et al. ......................... 717/127 |
| 7,577,722 | B1 * | 8/2009 | Khandekar et al. ........... 709/220 |
| 2005/0081212 | A1 | 4/2005 | Goud et al. |
| 2005/0198632 | A1 * | 9/2005 | Lantz et al. ....................... 718/1 |
| 2006/0004554 | A1 * | 1/2006 | Vega et al. .......................... 703/6 |

OTHER PUBLICATIONS

M. El-Darieby et al "Intelligent Mobile Agents: Towards Network Fault Management Automation", 1999.*

* cited by examiner

*Primary Examiner* — Lechi Truong
*Assistant Examiner* — Abdou Seye
(74) *Attorney, Agent, or Firm* — Sills, Cummis & Gross P.C.

(57) ABSTRACT

A method and apparatus for dynamic assigning I/O device in virtual machine system, the virtual machine system comprises a service OS, a hypervisor and at least one guest OS. The service OS contains a device model module, the device model module providing an access platform for I/O device to the guest OS. The guest OS access the device model module through the hypervisor. One device state module for dynamic reflecting the device's state is increased in the device model module, the device state module dynamic altering the register condition of the device in hardware space. It is possible to dynamic control the access to I/O device by the guest OS by using the control panel in the service OS to dynamic alter the device's state in the device state module. One agent module is increased in guest OS, for altering the device's state in guest OS anytime based on the change of the device state.

8 Claims, 6 Drawing Sheets

METHOD AND APPARATUS FOR DYNAMICALLY ASSIGNING I/O DEVICE IN VIRTUAL MACHINE SYSTEM

BACKGROUND OF THE INVENTION

1. Field of Invention

The present invention relates to a virtual machine technique, and in particular to a method and apparatus for dynamically assigning input/output device in virtual machine system.

2. Description of Prior Art

At present, it is more and more common to run multiple operating systems (OS) on servers simultaneously. This is a standard function on Unix OS and host computers introduced by IBM, Sun and HP Incs. Various OSs can run individual tasks at optimal performance, while there is no interference between the tasks. This technique has been implanted onto x86 architecture based computer systems by Intel and AMD Incs. A new research made by Gartner Inc shows that virtualization is the most powerful technique in PC industry in the next decade. By separating software from hardware and allowing multiple OSs running on the same desktop, the virtualization technique in PC industry will bring a revolution in enterprise desktops.

Virtualization allows a platform to run multiple OSs in individual partitions or "devices". A physical computing system could operate as multiple "virtual" systems. A user can perform individual partitioning on separated platforms, thus the risk of virus on one partition infecting other partitions or even the whole network could be reduced.

FIG. 1 is a structural diagram of a prior art virtual machine system, which includes a service operating system (service OS), at least one guest operating systems (guest OS), and a hypervisor (virtual machine monitor, also referred to VMM), wherein the service OS comprises a device model, a control panel, and a native device driver. The control panel is used to create a guest OS, delete a guest OS, and specify device information for the configuration file of a guest OS. As each guest OS being created, a corresponding configuration file and a device model are generated. Based on the configuration file, the device model sets the enabled and disabled states of the devices in a guest OS corresponding to it. A guest OS searches hardware upon startup, obtaining device configuration information of the guest OS from a device model through a hypervisor. The device model situated on a service OS provides the corresponding guest OS with full hardware platform information, i.e. a virtual hardware platform. All the hardware devices "seen" by a guest OS are virtualized by a device model. A hypervisor provides a guest OS with a channel for accessing device models. All the access, requests, and various operations for hardware devices by a guest OS are passed to device models through the hypervisor. Then, the device models interact with hardware through a real hardware drive, and pass the response and operating results of the hardware to the guest OS through the hypervisor. Thus, real hardware devices can be normally accessed by a guest OS.

The key of virtualization is to provide various OSs with individual and separated hardware platforms. This technique is implemented mainly by software due to the limit of hardware in PC. However, the implementation in prior art could only assign I/O devices statically. If the configuration of I/O devices in a virtual system need to be changed, a configuration file in a Control Panel must to be modified firstly, then the system will be rebooted in order to carry the configuration into effect. Therefore, flexible assigning of I/O devices in a virtual system is limited.

SUMMARY OF THE INVENTION

An object of the present invention is to provide a method for dynamically changing the I/O devices owned by a virtual system during operation of a system. The method allows hardware resources to be assigned by the virtual system during its run time, causing the ownership of I/O devices in the virtual system be changed dynamically without rebooting the system. It avoids the system reboot after changes of the resources. In order to achieve the above object, the present invention adopts the following technical solution.

The present invention provides a virtual machine system including a service operating system and at least a guest operating systems, wherein the service operating system comprises a device model module to provide the guest operating systems with an input/output device access platform, characterized in that the device model module can control the access to input/output devices by the guest operating system dynamically.

The present invention provides a virtual machine system including a service operating system, at least a guest operating systems and a hypervisor. The service operating system comprises a device model module to provide the guest operating systems with an input/output device access platform. The guest operating systems are created by the service operating system through a virtual technique, each guest operating system has a corresponding device model and a configuration file recording the device configuration information in the service operating system. The device model is accessed by the guest operating systems through the hypervisor. The access to the input/output devices by the guest operating systems can be controlled by the device model module dynamically.

The device model module further comprises a device state module which can reflect enabling and disabling of the input/output devices by registering and canceling the devices in a hardware space dynamically.

The device model registers the devices in the hardware space when the input/output devices in the device state module are enabled, the devices in the hardware space are discoverable to the guest operating systems, and the device model provides the guest operating systems with normal access to the devices.

The device model cancels the devices in the hardware space when the input/output devices in the device state module are disabled, the devices in the hardware space are undiscoverable to the guest operating systems, then the devices can not be accessed by the guest operating systems.

The service operating system comprises a control module which can change the states of the input/output devices in the device state module.

The control module may be a control panel in the service operating system.

The control module comprises a dynamic assigning device command program.

The dynamic assigning device command program can change a configuration file and the states of the input/output devices in the device state module simultaneously.

The guest operating systems comprise an agent module used to stop the devices or scan the hardware space according to a message event regarding modification of the devices.

The present invention also provides a method for dynamically assigning input/output devices in a virtual machine system, wherein the virtual machine system comprises a service operating system and at least one guest operating to systems, the service operating system comprises a device model module to provide the guest operating systems with an input/output device access platform, characterized in that the method comprises setting, in the device model module, a device state module which can change the states of the input/output devices in the guest operating systems dynamically, changing, by the device state module, registration situation of the devices in a hardware space; wherein in the case of an enabled state, the devices have been registered, and the guest operating systems can discover the devices when scanning the hardware space; the device model module provides a normal access for the guest operating systems when a request for accessing the device is issued; in the case of a disable state, the registration of the devices in the hardware space are cancelled by the device state module, and the guest operating systems can not discover the devices when scanning the hardware space, and thus will not access the devices.

The present invention also provides a method for dynamically assigning input/output devices in a virtual machine system, wherein the virtual machine system comprises a service operating system, at least a guest operating systems and a hypervisor, the service operating system comprises a device model module to provide the guest operating systems with an input/output device access platform, the device model is accessed by the guest operating systems through the hypervisor, the method comprises: setting a device state module which can change the states of the input/output devices in the guest operating systems dynamically, changing, by the device state module, registration situation of the devices in a hardware space; wherein in the case of an enabled state, the devices have been registered, and the guest operating systems can discover the devices when scanning the hardware space; the device model module provides a normal access for the guest operating systems when a request for accessing the device is issued; in the case of a disable state, the registration of the devices in the hardware space is cancelled by the device state module, and the guest operating systems can not discover the devices when scanning the hardware space, thus will not access the devices.

A dynamic assigning device command is added into a control panel of the service operating system, the command can change the states of the devices in the device state module at any time.

The operations of configuration files of the guest operating systems are performed by the dynamic assigning device command simultaneously, so as to modify the enabled and disabled states of the corresponding devices.

An agent module is added into the guest operating systems, the device model module sends to the agent module a message event when the states of the devices in the device state module are changed, the agent module stops the device or rescans the hardware space according to the message event.

The present invention is an improvement based on implementation of an existing art VMM architecture and virtual I/O devices. During virtualization of the devices, the virtualized devices are made unavailable to a certain operating system by means of software according to a configuration information, in order to control the access authority of the operating system to the I/O devices.

BRIEF DESCRIPTION OF THE DRAWINGS

The preferred embodiments of the present invention are described below with reference to the drawings, in which.

DETAILED DESCRIPTION OF PREFERRED EMBODIMENTS

Now, the present invention will be elaborated with respect to the figures.

Figure 1:
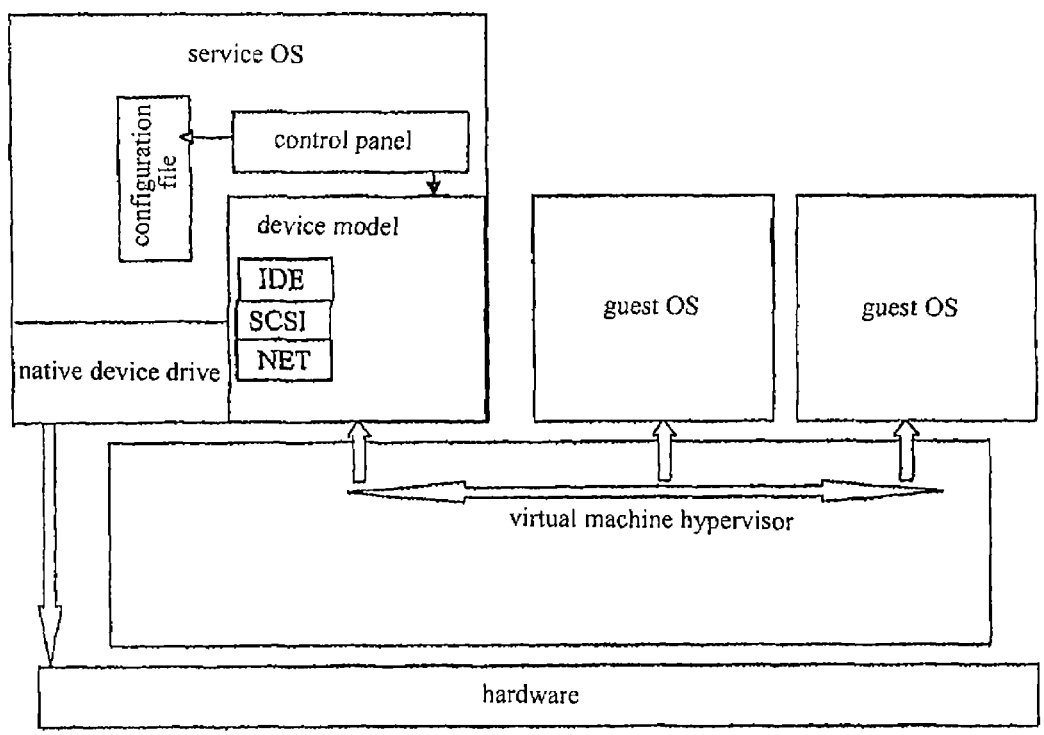
FIG. 1 is a structural diagram of a prior art virtual machine system.
Figure 2:
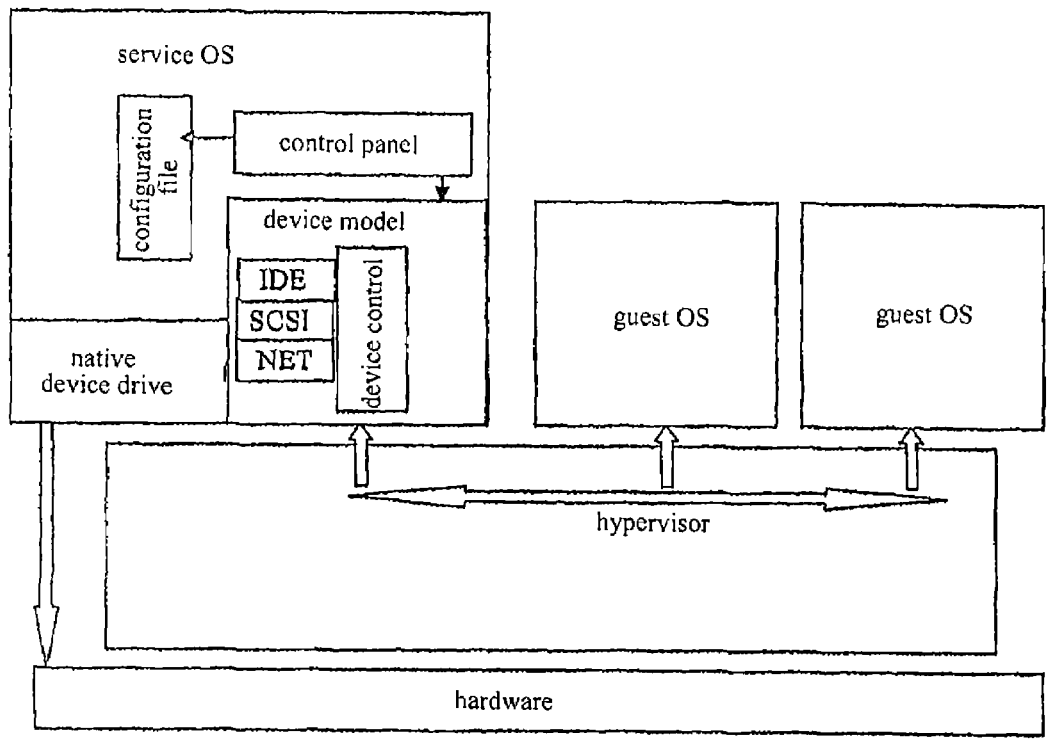
FIG. 2 is a structural diagram of a virtual machine system according to the present invention.

Referring to FIG. 2, the virtual machine system in the present embodiment includes a service operating system (service OS), two guest operating systems (guest OS) and a hypervisor, wherein the service OS comprises a device model module, a control panel, and a native device driver. The device model module further comprises a device state module. The control panel is used to create and delete a guest OS, guest and specify device configuration information for the configuration file of a guest OS. As each guest OS being created, a corresponding configuration file and a device model are generated. All the enabled and disabled states of hardware with respect to a corresponding guest OS are configured in a configuration file. Based on the configuration file, a device model module virtualizes all the hardware information, and sets the enabled and disabled states of devices in corresponding guest OS in the device state module. The corresponding registration and cancellation actions of devices are performed by the device state module in the supplied hardware space. A guest OS searches hardware upon startup, and obtains device configuration information of the guest OS from a device model through a hypervisor. The device model situated on a service OS provides various guest OSs with full hardware platform information, i.e. all virtual hardware platforms. All the hardware devices "seen" by a guest OS are virtualized by a device model. A hypervisor provides a guest OS with a channel for accessing device models. All the access, requests, and various operations for hardware devices by a guest OS are passed to device models through the hypervisor. Then, the device models interact with hardware through a real hardware driver, and pass the response and operating results of the hardware to the guest OS through the hypervisor. A device state module is added for realizing recordation of enabled and disabled states of devices and changing the registration situations of devices in the hardware space. In the configuration file, there is a corresponding field to indicate the enabled and disabled states of devices in the description of each device. Upon startup of a device model, a device states field in the configuration file is read by the device model module, and the corresponding registration situation of the device is to be set. In the present invention, a control panel comprises a dynamic assigning device command program which changes the states of devices. After startup of the system, the states of devices in the configuration file and the registration situations of devices in the device state module can be changed directly through the command program. The implementation of the command program is well known to the skilled in the art. Thus, devices can be assigned to a guest OS dynamically at run time by changing the enabled and disabled states of the devices at any time.

Figure 3:
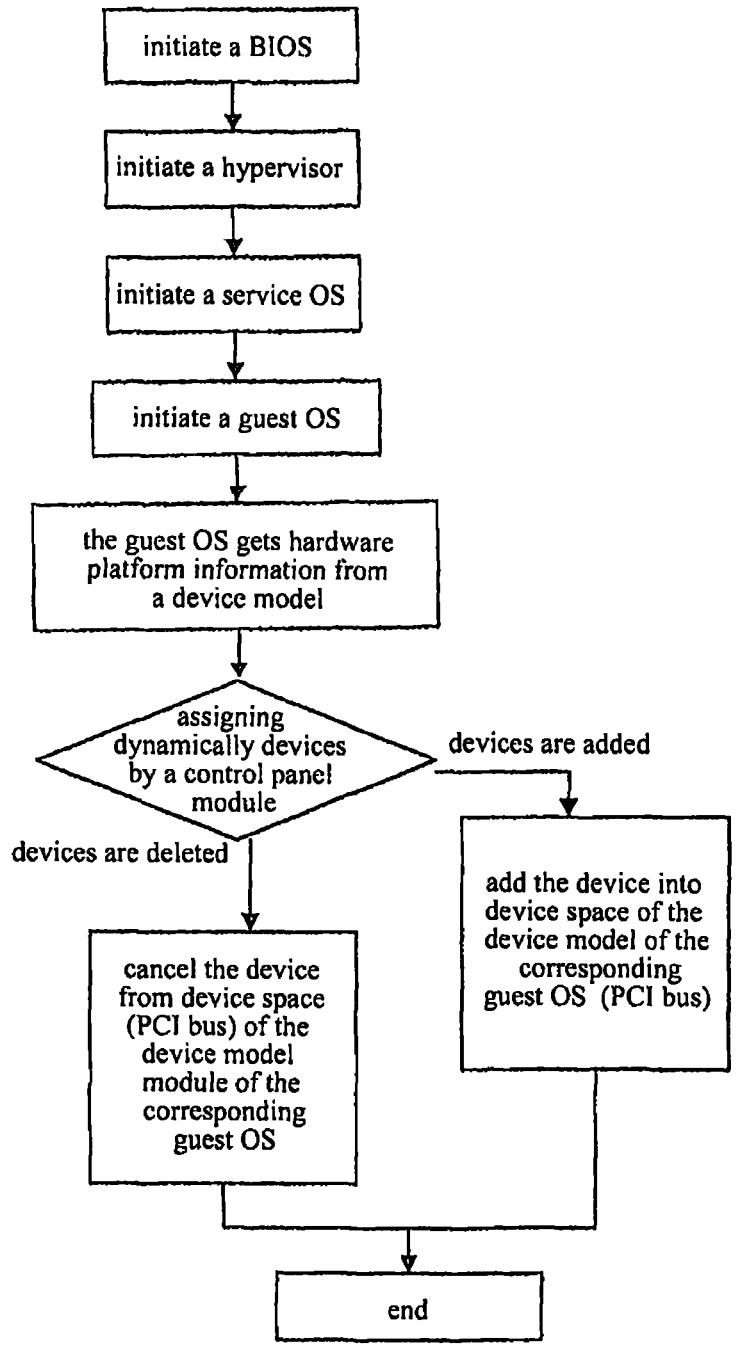
FIG. 3 is a flow chart of assigning of devices according to the present invention.

The assigning process of devices are described in detail below with reference to FIG. 3. After power on, a Basic Input Output System (BIOS), a hypervisor and a service OS are initiated sequentially. During the initiation of a guest OS, full hardware platform information is provided by a device model module firstly, and whether the device is available to corresponding guest OS is marked in a virtual device model according to the disabled and enabled states of the device in a configuration file, so as to perform the registration program in a corresponding hardware space. The guest OS gets hardware platform information from a device model. After the initiation of a guest OS, a dynamic assigning device command in the control panel is invoked if devices are needed to be assigned. If a device is to be added through the command, the device is enabled in the device state module corresponding to the client OS, that is, the device is registered in the hardware space. At the same time, the state of the device will be changed to be enabled in a corresponding configuration file. If a device is to be deleted through the command, the device is disabled in the device state module corresponding to the guest OS, that is, the registration of device in the hardware space will be cancelled. At the same time, the state of the device will be changed to be disabled in a corresponding configuration file.

Figure 4:
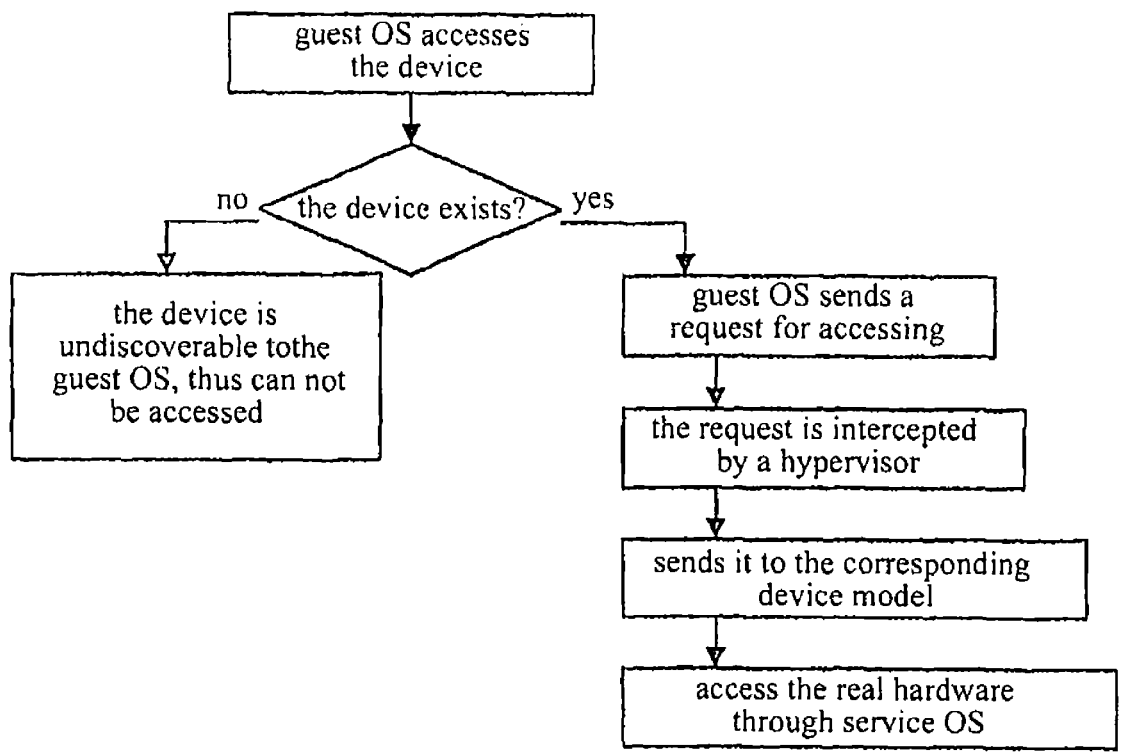
FIG. 4 is a flow chart of access to devices by a guest OS according to the present invention.

Referring to FIG. 4, access to devices by a guest OS is described in detail. Firstly, a request for accessing is needed to be sent to hardware space when the hardware space is scanned by a guest OS. This request is intercepted by a hypervisor, and then is sent to a corresponding device model module. The device model module judges whether the device is disabled in the device state module, that is, whether the device is registered. If not registered, the device model module returns error information regarding the request, and the device is undiscoverable to the guest OS; otherwise, the device model generates a response for the request, and the guest OS is able to discover the device and use it.

Figure 5:
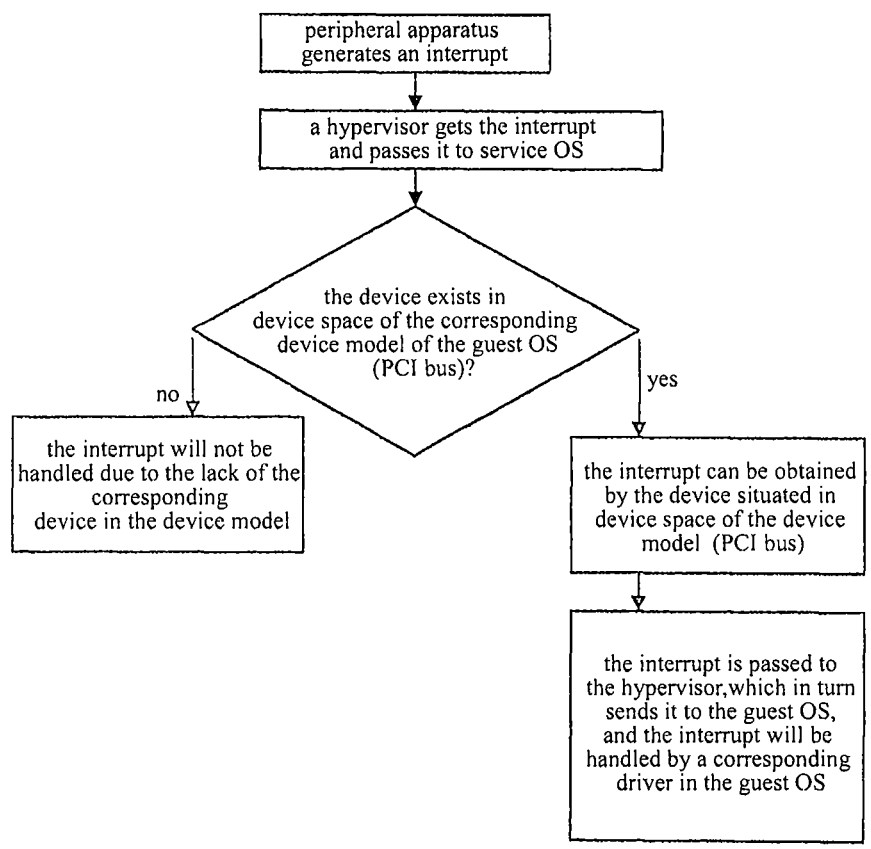
FIG. 5 is a flow chart of interrupt process for peripherals according to the present invention.

FIG. 5 is a flow chart of interrupt process for peripherals. After an interrupt signal for peripherals is generated, information on the interrupt signal is obtained by a hypervisor firstly, and then is passed to a service OS by means of an event mechanism. The service OS finds out the interrupt routine corresponding to a related interrupt vector, e.g. a driver in the native driver module, and handles the interrupt for peripherals, such as reading data into queues or buffering (in the buffer storage). If the devices have been registered in the hardware space, the device model module will access the queues or buffers initiatively at regular intervals. If there are data in the queues or buffers, the data are read by corresponding device model module. After obtaining the information, the device model module generates an interrupt and passes it to a hypervisor. The interrupt is passed to corresponding guest OS by the hypervisor, and is handled by an appropriate driver in the guest OS. If the devices have not been registered in the hardware space, the interrupt for peripherals and data can only be handled by a service OS.

Figure 6:
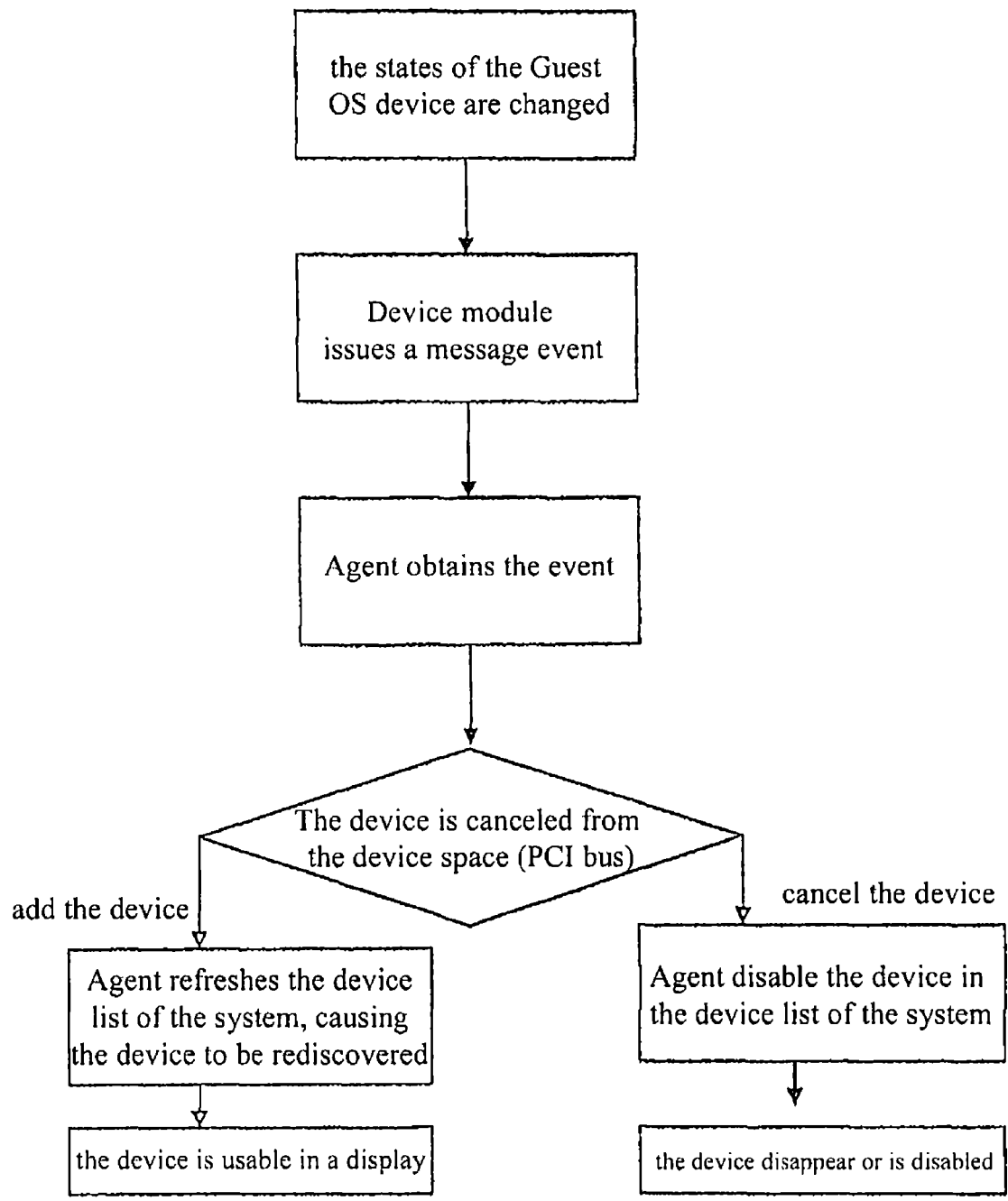
FIG. 6 is a flow chart of process for the consistency of the device state in a guest OS with it in a virtual hardware platform.

FIG. 6 is a flow chart of process for the consistency of the device state in a guest OS with that in a virtual hardware platform, wherein an agent module which stops devices or rescans a hardware space is added to the guest OS. The process is as follows. If the device states in a device state module of the device model module corresponding to a guest OS is modified by a control panel, the device model sends a message event regarding this modification to a hypervisor, which in turn sends the message event to an agent module. After obtaining the message event, the agent module judges whether there is some devices to be disabled. If so, the agent module executes a cancellation registration function, and saves the initialization information for the devices configured by the OS. The device state in the guest OS shows a disabled state, or the device is disappear. Otherwise, the agent module executes a registration function, and resumes the initialization information for the devices configured by the OS. The device state in the guest OS shows a normal state.

Although a few embodiments of the present invention have been shown and described, it will be appreciated by those skilled in the art that improvements and changes could be made therein without departing from the principles and spirit of the invention. The improvements and changes shall fall into the scope of the invention.

What is claimed is:

1. A computer programmed to include a service operating system, at least a guest operating systems and a hypervisor, the service operating system comprising:
a device model module for providing the guest operating systems with an input/output device access platform, and for controlling access to input/output devices by the guest operating systems dynamically, and wherein the
hypervisor providing the guest operation systems with channels for accessing device models in the device model module, the device model module further comprising a device state module which can reflect enabling and disabling of the input/output devices in the device model with respect to the guest operating systems dynamically, the device model module further registering devices in a hardware space when the input/output devices in the device state module are enabled, the devices in the hardware space are discoverable to the guest operating systems, and the device model module providing the guest operating systems with normal access to the devices, wherein the device model module cancels the devices in a hardware space when the input/output devices in the device state module are disabled, the devices in the hardware space are undiscoverable to the guest operating systems, and then the devices can not be used by the guest operating systems, wherein the service operating system comprises a control module, the control module can change states of the input/output devices in the device state module so as to change registration situation of the devices in the hardware space, the control module further comprising a dynamic assigning device command program added into a control panel of the service operating system, and the command can change the state of the devices in the device state module at any time, wherein the guest operating systems comprising an agent module used to stop a corresponding device or rescan the hardware space according to a message event regarding modification of the device states.

2. The computer of claim 1, wherein the dynamic assigning device command program can change a configuration file and the states of the input/output devices in the device state module simultaneously.

3. The computer of claim 2, wherein the guest operating systems comprises an agent module used to stop a corresponding device or rescan the hardware space according to a message event regarding modification of the device states.

4. The computer of claim 1, wherein the guest operating systems comprises an agent module used to stop a corresponding device or rescan the hardware space according to a message event regarding modification of the device states.

5. The computer of claim 1, further comprises a hypervisor, wherein the guest operating systems is created by the service operating system through a virtual technique, the guest operating systems has a corresponding device model module and a configuration file recording device configuration information in the service operating system, the device model is accessed by the guest operating systems through the hypervisor.

6. A method for dynamically assigning input/output devices in a computer programmed to include a service operating system, at least a guest operating systems, and a hypervisor, the method comprising:

setting, in a device model module, a device state module which can change states of the input/output devices in the guest operating systems dynamically;

changing, by the device state module, registration situation of devices in a hardware space; wherein in the case of an enabled state, the devices have been registered, and the guest operating systems can discover the devices when scanning the hardware space; the device model module provides a normal access for the guest operating systems when a request for accessing the devices is issued; in the case of a disable state, the registration of the devices in the hardware space is cancelled, and the guest operating systems can not discover the devices when scanning the hardware space, and thus will not issue a request for accessing the devices, wherein a dynamic assigning device command is added into a control panel of the service operating system, and the command can change the states of the devices in the device state module at any time, wherein further an agent module is added into the guest operating systems, the device model module sends to the agent module a message event when the states of the devices in the device state module are changed, and the agent module stops the devices or scans the hardware space according to the message event, wherein the service operating system comprises the device model module for providing the guest operating systems with an input/output device access platform, wherein the hypervisor provides the guest operation systems with channels for accessing device models in the device model module.

7. The method for dynamically assigning input/output devices in a computer of claim 6, wherein the operations on configuration files of the guest operating systems are performed by using the dynamic assigning device command simultaneously, so as to modify enabled and disabled states of the corresponding devices.

8. The method for dynamically assigning input/output devices in a computer of claim 6, wherein the device model is accessed by the guest operating systems through a hypervisor.

* * * * *